US011994262B2

(12) United States Patent
Van Schie et al.

(10) Patent No.: US 11,994,262 B2
(45) Date of Patent: May 28, 2024

(54) ARTIFICIAL FIREPLACE

(71) Applicant: KAL-FIRE BEHEER B.V., Belfeld (NL)

(72) Inventors: Michael Petrus Van Schie, Rotterdam (NL); Brian Hok Gwan Khouw, Rotterdam (NL); Sander Martijn Havik, Rotterdam (NL); Beyko Martijn Eli Van Melick, Belfeld (NL)

(73) Assignee: KAL-FIRE BEHEER B.V., Belfeld (NL)

( * ) Notice: Subject to any disclaimer, the term of this patent is extended or adjusted under 35 U.S.C. 154(b) by 365 days.

(21) Appl. No.: 17/421,641

(22) PCT Filed: Jan. 7, 2020

(86) PCT No.: PCT/NL2020/050007
§ 371 (c)(1),
(2) Date: Jul. 8, 2021

(87) PCT Pub. No.: WO2020/145819
PCT Pub. Date: Jul. 16, 2020

(65) Prior Publication Data
US 2022/0090751 A1 Mar. 24, 2022

(30) Foreign Application Priority Data
Jan. 11, 2019 (NL) ..................................... 2022379

(51) Int. Cl.
*F21S 10/04* (2006.01)
*G02B 27/14* (2006.01)
(Continued)

(52) U.S. Cl.
CPC .............. *F21S 10/04* (2013.01); *G02B 27/14* (2013.01); *G02B 30/60* (2020.01); *F24C 7/004* (2013.01)

(58) Field of Classification Search
CPC ......... F21S 10/04; G02B 30/60; G02B 27/14; F24C 7/004
See application file for complete search history.

(56) References Cited

U.S. PATENT DOCUMENTS 5,195,820 A 3/1993 Rehberg
2006/0101681 A1* 5/2006 Hess ....................... G09F 19/12
40/428

(Continued)

FOREIGN PATENT DOCUMENTS

CN 205606456 U 9/2016
EP 3473934 A 12/2013

(Continued)

*Primary Examiner* — Gary C Hoge
(74) *Attorney, Agent, or Firm* — BROWDY AND NEIMARK, P.L.L.C.

(57) ABSTRACT

The present invention provides an artificial fireplace for displaying an artificial fire pattern. The fireplace comprises a housing, defining an interior and comprising at least one opening to allow a line of sight into the interior, a semi-transparent mirror, which is arranged in the interior and which comprises a first side, facing the opening, and an opposite second side, facing away from the opening. The fireplace further comprises a first display device, which is arranged in the housing and which is configured to display a first video of flames, towards the first side of the semi-transparent mirror, and a second display device, which is arranged in the housing and which is configured to display a second video towards the second side of the semi-transparent mirror. The semi-transparent mirror is arranged to at least partially reflect the first video of flames at its first side and to at least partially transmit the second video at its second side, in order to recombine the first video of flames and the second video into the artificial fire pattern, such that the artificial fire pattern is visible along the line of sight.

18 Claims, 8 Drawing Sheets

Figure 4A:
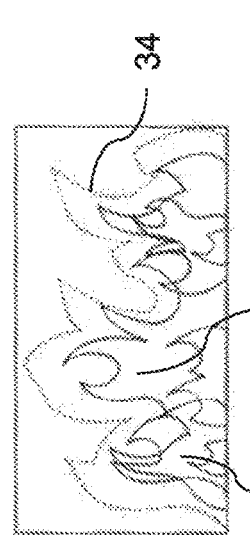

(51) Int. Cl.
 *G02B 30/60* (2020.01)
 *F24C 7/00* (2006.01)

(56) References Cited

U.S. PATENT DOCUMENTS

| | | | | |
|---|---|---|---|---|
| 2014/0373406 | A1* | 12/2014 | Flynn | F24C 7/004 |
| | | | | 40/428 |
| 2017/0089587 | A1* | 3/2017 | Nemes | F24C 15/36 |
| 2018/0347818 | A1* | 12/2018 | Birnbaum | F24C 7/004 |
| 2023/0130255 | A1* | 4/2023 | Van Schie | F24B 1/1808 |
| | | | | 40/428 |

FOREIGN PATENT DOCUMENTS

| | | |
|---|---|---|
| GB | 2502814 A | 12/2013 |
| RU | 175788 U1 | 12/2017 |

\* cited by examiner

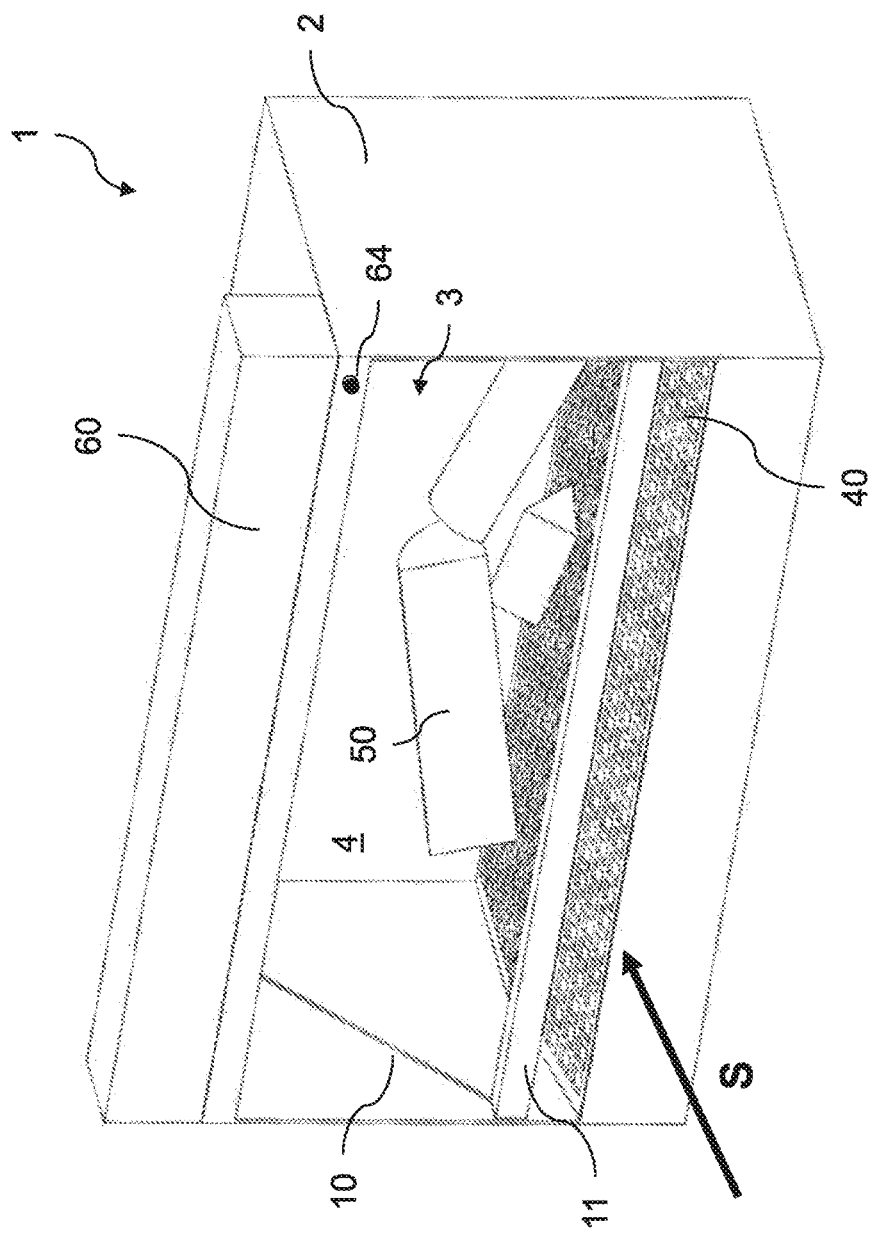

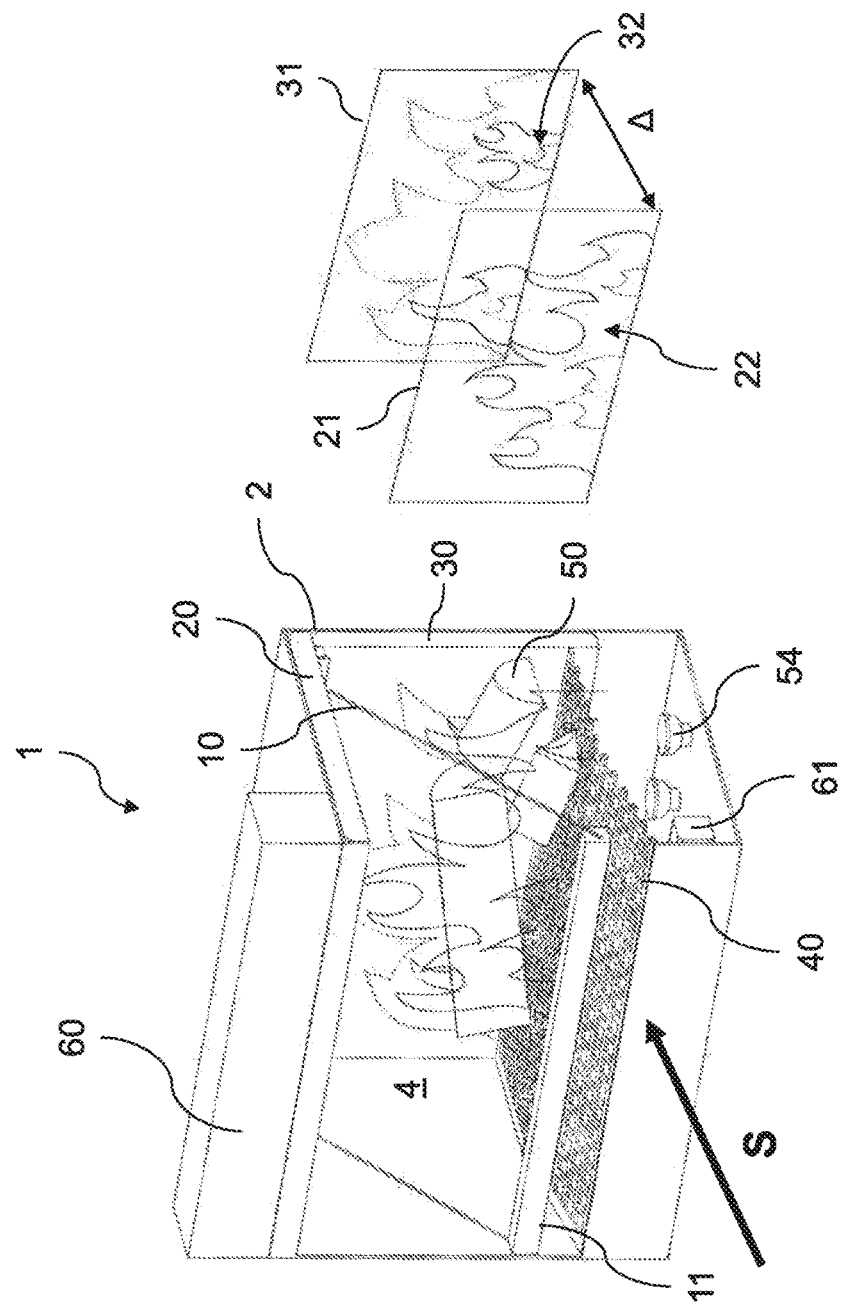

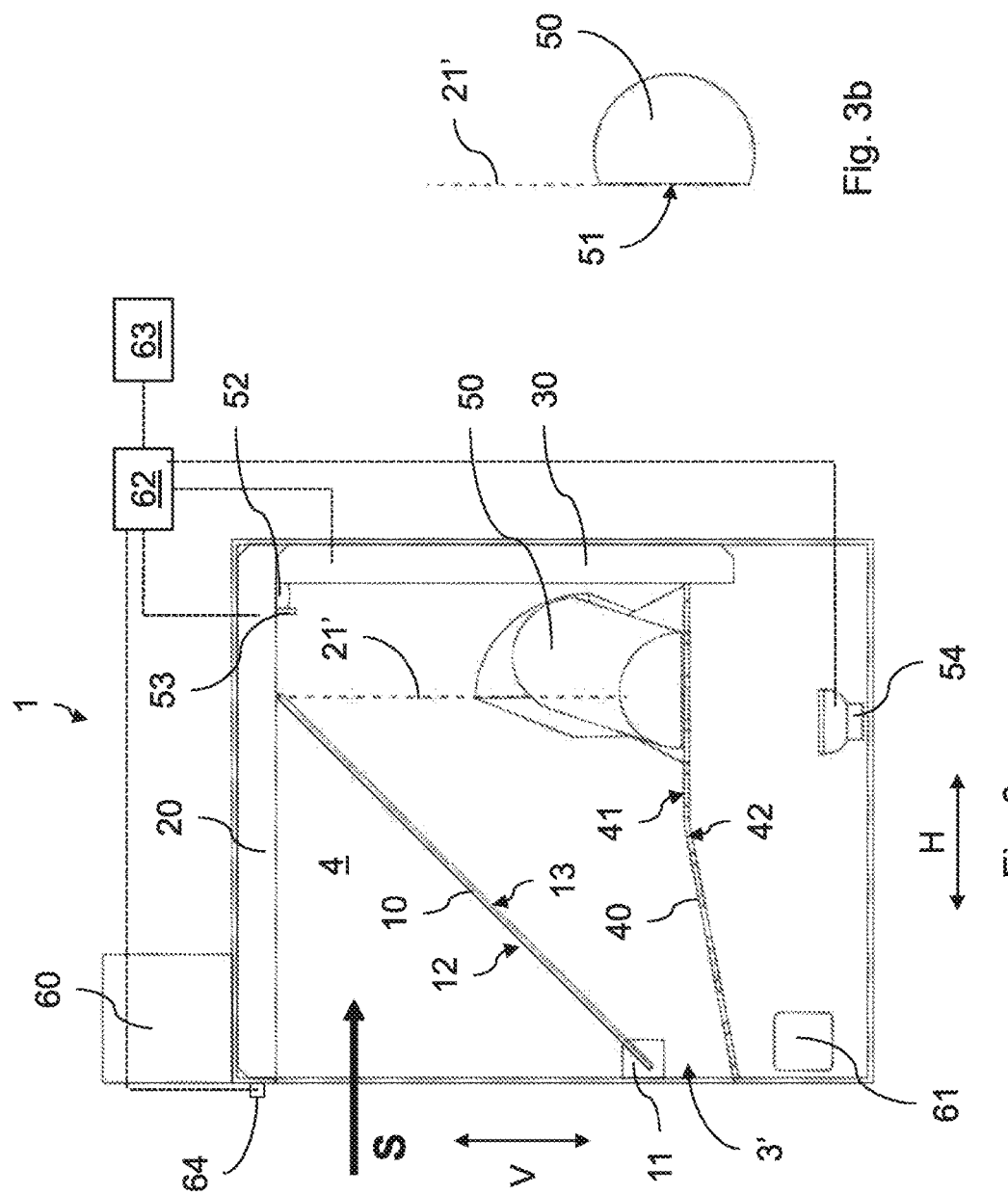

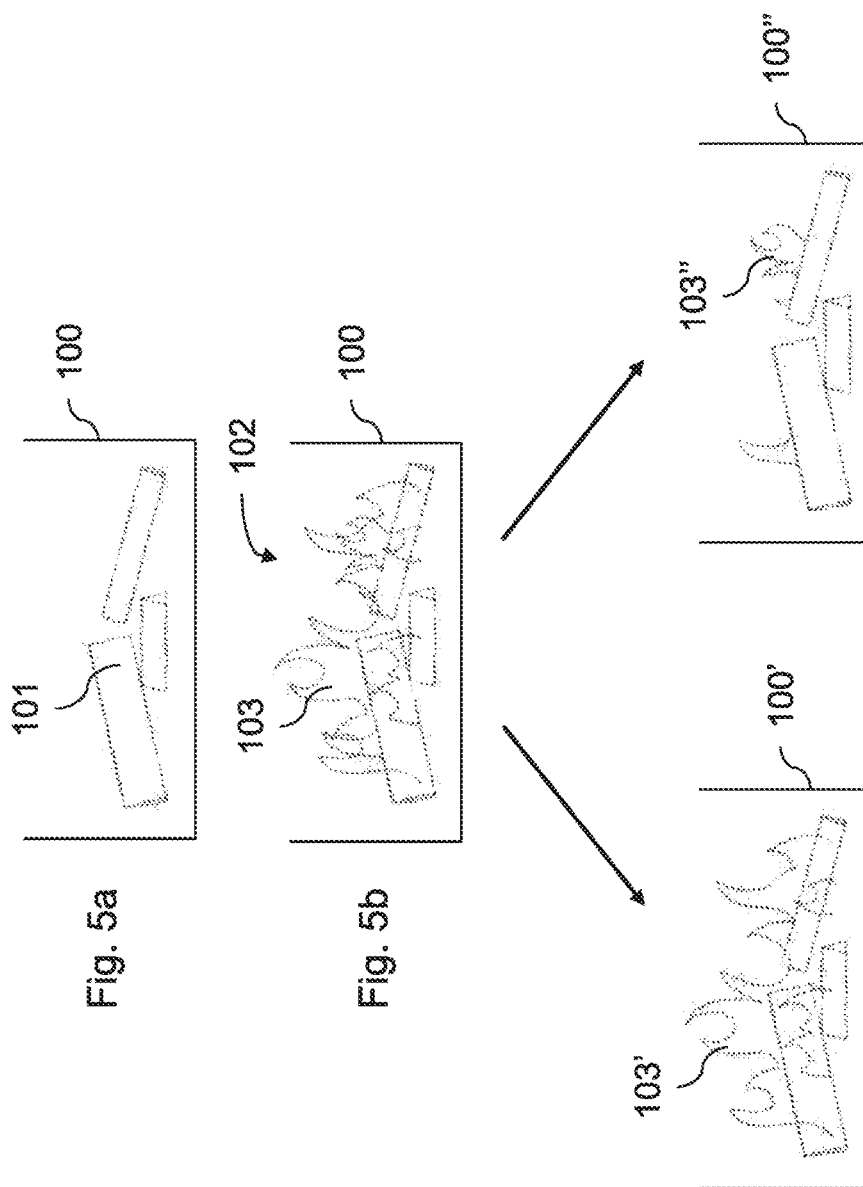

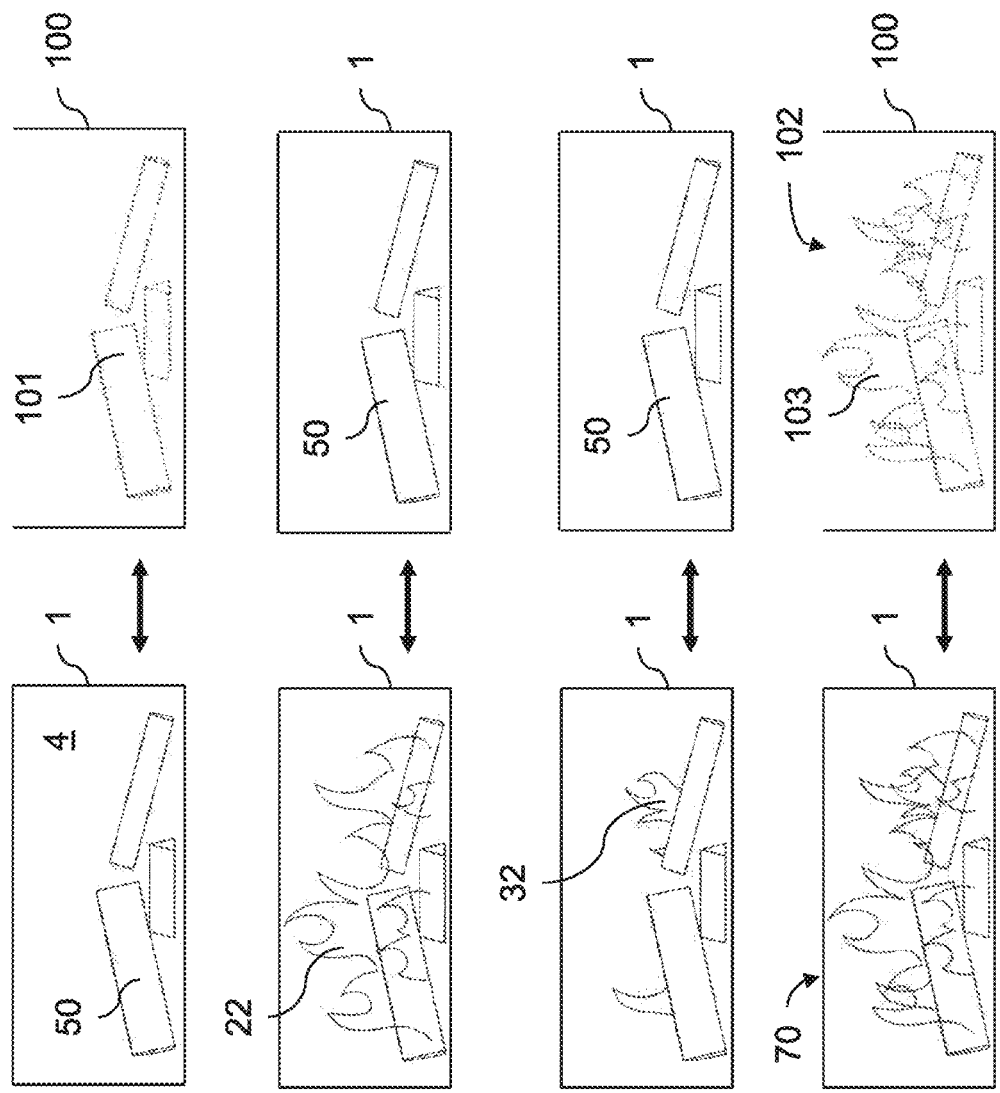

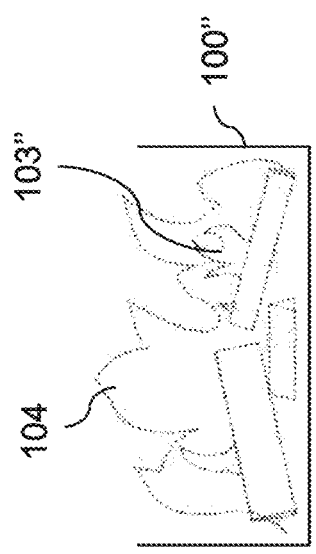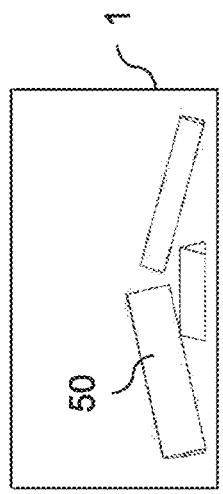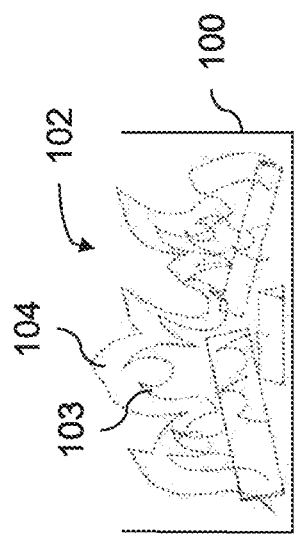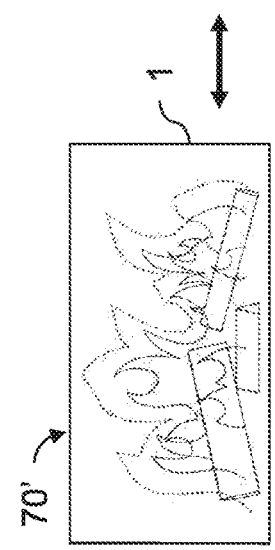

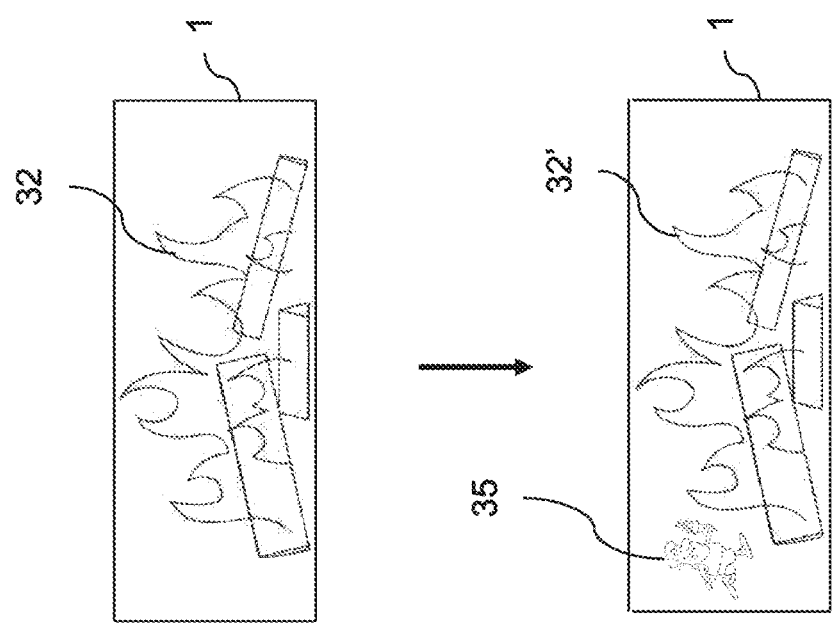

ARTIFICIAL FIREPLACE

The present invention relates to an artificial fireplace. The present invention further relates to a method for displaying an artificial fire pattern with an artificial fireplace.

Artificial fireplaces are known for some time. Generally, these fireplaces are configured to display a video of a fire, without requiring the presence of an actual fire. These systems may thus be more environmentally friendly, since they do no produce any exhaust fumes, and the systems may be easily placed in existing buildings, without requiring the provision of chimneys or the like.

From U.S. Pat. No. 5,195,820 (A), such a fireplace is known, configured to display simulated flames. This prior art fireplace comprises a housing, in which a simulated fire bed, comprising logs or the like, is arranged. The fireplace further comprises a video projector, configured to project a recorded video of a fire, and a beam-splitting panel. The beam-splitting panel is configured to reflect the projected video of the fire and to emit a combined projection thereof, in which the video of the flames appears to be superimposed on the simulated fire bed.

Despite the fact that this fireplace already simulates an actual fire, without having any emissions, does it still not accurately display an actual fire. Although the imaged flames are intended to be superimposed on the fire bed, is the resulting combined video still not accurate and is it, even for ignorant users, immediately apparent that the projected flames are not realistic.

It is therefore an object of the present invention to provide an artificial fireplace that is configured to project a more realistic artificial fire pattern or at least to project an alternative artificial fire pattern.

The present invention provides an artificial fireplace for displaying an artificial fire pattern, comprising:
- a housing, defining an interior and comprising at least one opening to allow a line of sight into the interior of the housing,
- a semi-transparent mirror, which is arranged in the interior of the housing and which comprises a first side, facing the opening, and an opposite second side, facing away from the opening,
- a first display device, which is arranged in the housing and which is configured to display a first video of flames, characterized in that the artificial fireplace further comprises:
- a second display device, which is arranged in the housing and which is configured to display a second video, wherein the semi-transparent mirror is arranged to at least partially reflect the first video of flames at its first side and to at least partially transmit the second video at its second side, in order to recombine the first video of flames and the second video into the artificial fire pattern, such that the artificial fire pattern is visible along the line of sight.

The artificial fireplace according to the present invention is configured to display two videos from two different display devices, instead of the single video from a single display device in the fireplace that is known from prior art. The first video of flames is displayed by the first display device and is emitted towards the semi-transparent mirror, where the first video of flames is at least partially reflected to be visible through the opening in the housing and along the line of sight. The second video is displayed by the second display device and is, seen along the line of sight, emitted from behind the semi-transparent mirror and towards the second side of the semi-transparent mirror. The semi-transparent mirror is configured to at least partially transmit the second video at its second side, so that the second video is also visible through the opening in the housing and along the line of sight.

Both videos generate a layered effect in the fireplace, since the first video is projected such, that when seen along a line of sight through the semi-transparent mirror, the flames appear to originate from a first, preferably vertical plane, whereas the second video appears to originate from the back of the artificial fireplace and at a distance from where the flames in the first video appear to originate.

As such, the layered effect generates a more realistic artificial fire. The artificial fire pattern more accurately mimics an actual fire, since actual fires generally also have flames that originate at multiple depths in a fireplace, whereas the displayed flames in the prior art fireplace only appear to originate from a single plane in the fire.

In an embodiment, the semi-transparent mirror of the artificial fireplace, comprises a transparent pane, for example a glass pane, a first coating that is provided on a first side of the pane and a second coating that is provided on a second side of the pane. The first side of the pane may correspond to the first side of the semi-transparent mirror and the first coating may be a reflective coating that is configured reflect light, in order to form the reflective first side of the semi-transparent mirror. The second side of the pane may correspond to the second side of the semi-transparent mirror and the second coating may be a transmitting coating that is configured transmit light, in order to form the transmitting second side of the semi-transparent mirror.

Alternatively or additionally, the semi-transparent mirror comprises a polarizing foil that is applied on the first surface of the mirror. The polarizing foil may for example comprise a microlouver layer, which comprises three-dimensional elements that together define a grid-like structure having apertures in between. The apertures allow for transmission of light in a range of directions substantially parallel to the apertures and provide for absorption of light that is non-parallel with the apertures. Accordingly, the polarizing foil may allow for transmission of the reflected first video of flames and the transmitted second video in a certain direction, e.g. along the line of sight and/or perpendicular to the plane of the semi-transparent mirror, and may allow for absorption of undesired light reflections in other directions, for example to prevent reflections of light from the surroundings, such as sun light or ceiling lights, of the fireplace to be visible.

In an embodiment of the artificial fireplace, the second video comprises a second video of flames. The second video of flames preferably differs from the first video of flames and is preferably synchronized with the first video of flames during use of the fireplace. The second video of flames is displayed with the second video and therefore originates from behind the semi-transparent mirror and from a different area than the area from which the first video of flames appears to originate.

In a further embodiment, the second video comprises a video of a background of a fireplace and further comprises a video of a glow effect on the background. This glow effect represents the illuminating effect that flames would have on a background of the fireplace. As such, the artificial fireplace not only displays the flames directly, but also displays indirect lighting by the flames.

The glow effect is emitted with the second video, which originates from behind the semi-transparent mirror. It does, as such, appear that the displayed glow effect originates from a rear portion of the artificial fireplace, and from behind the location from which the flames in the first video appear to originate.

In an additional embodiment, the video of the glow effect on the background is substantially synchronized with the first video of flames and/or with the second video of flames in the second video. Here, the term synchronized means that the position of the glow effect corresponds to the position of the flames in the first video and the second video. Hence, along a line of sight into the artificial fireplace, the glow effect appears to surround the flames in the first video and/or the second video. Furthermore, the synchronization implies that the video of the glow effect is timed with the first video of flames and/or the second video of flames such, that movements of the flames in the first video and/or in the second video correspond to movements of the glow effect.

Alternative or additional to the polarizing foil on the semi-transparent mirror, the first display device may comprise a polarizing foil. This polarizing foil on the first display device is configured to absorb light that is emitted in directions at relatively large angles with a normal direction of the first display device. Along these large angles, the displayed image may be ruled over by backlight to a large extent, giving rise to a blurred displayed image. By absorbing light in directions at these large angles, the amount of backlight emitted by the fireplace is reduced and the overall realism of the artificial fireplace is improved.

Alternatively or additionally, the second display device may comprise a similar polarizing foil to reduce the visibility of backlight in the displayed image.

In an embodiment, the first display device and/or the second display device is configured to display multiple different respective first videos and/or second videos. Each of the different videos may comprise flames that have a different height and/or flames that have a different intensity. As such, the flame height and/or intensity of the displayed artificial fire pattern may vary between different videos, allowing a user to display different types of flames.

Additionally, the artificial fireplace may comprise an input device, for example being embodied as a rotatable knob. The user may use the input device for selecting an appropriate artificial fire pattern that is to be displayed with the artificial fireplace. Accordingly, the input device may be used to select the flame height and/or intensity of the displayed artificial fire pattern, e.g. for selecting which of the multiple first videos and/or second videos are to be displayed by means of the first display device and/or second display device.

The input device may be a rotatable knob on the outside of the fireplace, which allows a user of the artificial fireplace to set a parameter for the artificial fire pattern that is to be displayed with the artificial fireplace. Alternatively, the input device may be a remote control device or may be a mobile communication device, such as a smartphone, on which an application is installed to control the artificial fireplace. The input device may for example be formed by one or more buttons on the remote control device or may be formed by a virtual slider in the application on the mobile communication device.

In an embodiment, the first video of flames and the second video of flames have been extracted from a recorded video of an actual fire that burns in an actual fireplace. The first video thereby represents flames that originate from a first area in the actual fire, whereas the second video represents flames that originate from a second, different area in the actual fire. Preferably, the video of the glow effect is extracted from the recorded video as well and represents the simultaneous enlightening of the background of the actual fireplace, which corresponds to the flames in the first video and/or the second video.

The video of the glow effect may in the second video be combined with a video of a background of a fireplace, such that the glow effect may be visible on the background in order to obtain an even more realistic effect.

In an embodiment, the first display device and the second display device are provided as a monitor, such as an LCD monitor. These monitors have the advantage that they are relatively thin and able to produce a sufficient amount of light, allowing the first video to be visible, despite being reflected by the semi-transparent mirror, and allowing the second video to be visible, despite being transmitted by the semi-transparent mirror. Preferably, the amount of backlight of the monitors is minimized in areas that surround the displayed flames in order to provide flames with a sufficient brightness and to improve the contrast of the flames in the first video and the second video.

In an embodiment of the artificial fireplace, the semi-transparent mirror is, in an installed configuration of the artificial fireplace, set at a non-right angle with respect to a vertical direction. The semi-transparent mirror is set at an angle with the vertical direction that is in the range between 0° and 90°, but not being equal to 0° and 90°.

In an additional embodiment, the first side of the semi-transparent mirror at least partially faces in an upright direction. The upright direction is aligned parallel to an upward vertical direction. The first side of the mirror has a first line perpendicular to its plane, which has at least a component that is aligned in the upright direction. The first display device is arranged at least partially above the semi-transparent mirror and thereby faces the first side of the semi-transparent mirror. During use of the artificial fireplace, the first display device is configured to display the first video of flames in a downward direction, towards the first side of the semi-transparent mirror.

In an alternative embodiment, the orientation of the semi-transparent mirror may be reversed. In this embodiment, the second side of the semi-transparent mirror at least partially faces in an upright direction. The first side of the semi-transparent mirror thereby has a second line perpendicular to its plane, which has at least a component that is directed in a downwards vertical direction, opposite to the upright direction. In this embodiment, the first display device is arranged at least partially below the semi-transparent mirror. During use of the artificial fireplace, the first video of flames is displayed in the upright direction, towards the first side of the semi-transparent mirror.

In an additional embodiment, the non-right angle between the semi-transparent mirror and the vertical direction is between 25° and 65°, preferably between 35° and 55° and most preferable approximately 45°. With this preferred angle of 45°, the first display device may be arranged substantially horizontal to display the first video of flames in a downward vertical direction, towards the first side of the mirror and the second display device may be arranged vertical to display the second video in a horizontal direction, towards the second side of the mirror.

In a further embodiment, the semi-transparent mirror is arranged over the entire width of the artificial fireplace, such that edges of the semi-transparent mirror substantially abut sidewalls of the housing of the artificial fireplace. Preferably, the edges of the semi-transparent mirror have been grinded, to obtain a thin and smooth edge of the semi-transparent mirror, in order to minimize the visibility of the edges of the semi-transparent mirror.

In an embodiment, the first side of the semi-transparent mirror has been treated locally, in order to achieve different amounts of reflection across its surface. With this embodiment, it may be achieved that reflections from objects outside the artificial fireplace on the first side of the semi-transparent are reduced. For example, reflections of a ceiling or light sources in a ceiling may be minimized. Preferably, the second side of the semi-transparent mirror has been treated locally accordingly, in order to achieve different amounts of transmission across its surface. As such, the amount of backlight may be further reduced, in order to improve the contrast of the flames in the first video and the second video, and to improve the quality of the artificial fire pattern that is displayed.

In an exemplary embodiment, the semi-transparent mirror may, in a mid-portion, be treated such, that the light in the artificial fire pattern is composed of 30% of transmitted light from the second video and of 70% of reflected light from the first video of flames. Towards the edges of the semi-transparent mirror, this ratio is changed towards 10% from the second video and 90% from the first video of flames. Preferably, a gradual change is provided between the ratios at the mid-portion and towards the edges.

In an embodiment, the housing of the artificial fireplace comprises a cross bar, which extends horizontally across the opening in the housing, thereby splitting the opening in two portions. As such, an upper portion of the opening is defined above the cross bar and a lower portion of the opening is defined below the cross bar. The cross bar forms a support for the semi-transparent mirror, which is configured to rest on the cross bar, Furthermore, the cross bar is arranged to cover a frontal edge of the mirror, since this edge is located behind the cross bar, when seen along the line of sight.

Compared to when only a first opening in the housing were to be provided, spanning upward from the frontal bottom edge of the mirror, the two openings with the cross bar provide for a higher combined opening in the housing. As such, the artificial fireplace becomes more realistic.

With the covered front edge of the mirror, the cross bar thereby provides the impression that no mirror is provided at all, since the front edge would normally be most visible. Furthermore, the separating of the opening by means of the cross bar provides that a user may look into the interior of the housing both through the upper portion and the lower portion of the opening. When a user would look through the upper portion, the displayed artificial fire pattern is visible, whereas looking through the lower portion allows the user to see the other elements in the interior of the artificial fireplace, such as artificial wooden logs, light reflections and flickering light.

In an embodiment, the artificial fireplace further comprises an artificial fireplace element, which is arranged in the interior of the housing, in between the second display device and the semi-transparent mirror. The artificial fireplace element is, seen along the line of sight, thus arranged behind the semi-transparent mirror and are arranged in front of the second display device.

The artificial fireplace element comprises a plurality of element parts, which are arranged in a stacked configuration and which resemble element parts in an actual fireplace, such as wooden logs that burn in a traditional hearth. The artificial fireplace element is, however, not subjected to heat and is not configured to burn and do not need to be able to withstand heat, since no actual fire is to be provided on the element parts of the artificial fireplace element. For the artificial fireplace according to the present embodiment, the element parts may for example be provided as plastic copies of wooden logs.

In the prior art fireplace, a fire bed was arranged behind the semi-transparent mirror and an image of the fire bed was transmitted through the mirror. This resulted in the fact that the flames, being reflected on the mirror, appeared to originate from a location in front or in the middle of the fire bed.

According to the present embodiment, the artificial fireplace element is arranged in between the semi-transparent mirror and the second display device. This implies that the artificial fireplace element is arranged such, that, the artificial fireplace element is arranged on or behind the location where the flames in the first video are, seen along a line of sight through the semi-transparent mirror, displayed and from where these flames appear to originate.

However, the artificial fireplace element is arranged in front of the second display device, where the flames in the second video are displayed and from where these flames appear to originate. The flames are thus projected on or before and behind the artificial fireplace element, which contributes to the layered effect and which makes the displayed artificial fire pattern more realistic.

In particular, the artificial fireplace element comprises one or more element parts that comprise a flat frontal surface. The flat frontal surface thereby is, at least in an installed configuration of the artificial fireplace element in the interior of the housing, a vertical plane. The vertical frontal surface may be aligned with a virtual vertical plane of a vertical light beam that is to be emitted by the first display device, containing the first video of flames that is displayed by the first display device. This virtual vertical plane is the plane from which the first video appears to be displayed and lies, seen along the line of sight, behind the semi-transparent mirror, since the first video is actually displayed from a horizontal plane, e.g. from the horizontal first display device at the top of the housing, and from above the semi-transparent mirror. This at least one element part with vertical frontal surface does not intersect with the virtual vertical plane, but is rather coplanar therewith. Accordingly, the vertical frontal surface allows for accurate focussing of the first video and allow a user to experience the flames in the first video to appear to originate from the vertical frontal surfaces of the element parts.

In a further embodiment, the first video of flames comprises a glow effect, which is projected on the artificial fireplace element, in order to mimic glowing of the artificial fireplace element. This glow effect may comprise a projection of orange and/or red illuminations, of which the intensity may vary over time. The glow effect will be projected on the artificial fireplace element, e.g. on the artificial logs, but do not involve projection of the logs themselves.

The glow effect may provide that the artificial fireplace element may appear to glow, whereas this glowing is actually projected thereof with the first video, e.g. together with the projected flames.

In an additional or alternative embodiment, the artificial fireplace further comprises at least one first light source, which is arranged adjacent the artificial fireplace element and which is configured to illuminate the artificial fireplace element. The first light source may be provided as a strip of LEDs, which is arranged in a top portion of the housing and adjacent the first display device. The LED strip is configured to illuminate the artificial fireplace element, in order to improve their visibility. Hence, the artificial fireplace element is, seen along the line of sight, arranged behind the semi-transparent mirror and does not actively emit light.

Without being illuminated, the artificial fireplace element may be too dark to be sufficiently visible through the semi-transparent mirror. Hence, in an actual fireplace, the artificial fireplace element would be illuminated by the flames. By illuminating the artificial fireplace element with the at least one first light source, the visibility of the artificial fireplace element is improved, which contributes to the realism of the artificial fireplace.

The at least one first light source may be configured to illuminate the artificial fireplace element when the first display device and/or the second display device are deactivated, e.g. when no videos are displayed in the artificial fireplace. Since the artificial fireplace element is, seen along the line of sight, located behind the semi-transparent mirror, its visibility may normally be reduced due to the presence of the mirror. The illuminating of the artificial fireplace element may improve the visibility of the artificial fireplace element and may achieve the effect that the presence of the mirror is experienced less by the user, which allows that the realism of the artificial fireplace is improved and that it more accurately mimics an actual fireplace with a physical fireplace element, such as wooden logs, Here, the illuminating of the artificial fireplace element may comprise the illumination by means of emitted light that has a wavelength in the visible regime, for example having a wavelength spectrum that mimics daylight for resembling daylight that illuminates a physical fireplace element in an actual fireplace.

In a further embodiment, the at least one first light source is configured to illuminate the artificial fireplace element with a flickering effect. The flickering effect may for example comprise the illumination by means of emitted light that has a wavelength in the visible regime, for example having a red, orange or yellow colour for resembling the light that is emitted by actual flames in an actual fireplace. The flickering effect may alternatively or additionally comprise the varying of an intensity of the light that is emitted, in order to resemble the varying intensity of light that is emitted by actual flames in an actual fireplace.

The at least one first light source may, seen along the line sight, be arranged behind the semi-transparent mirror, such that its emitted light may illuminate the artificial fireplace element without being obstructed by any element in between the at least one first light source and the artificial fireplace element. For example, the at least one first light source can be embodied as a strip of LEDs across a substantial part of the width of the interior of the artificial fireplace, e.g. the entire width thereof. The strip of LEDs may be provided against the ceiling of the housing, behind the semi-transparent mirror, As such, the artificial fireplace element may be illuminated from across a substantial part of the overall width, in order to improve the realism of the illumination of the artificial fireplace element.

In an additional or alternative embodiment, the artificial fireplace further comprises a light sensor, which is configured to emit a light sensor signal that is representative for the intensity of the ambient lighting conditions outside the artificial fireplace. The light sensor may be disposed at the outside of the housing of the artificial fireplace, in order to allow for optimal detection of the ambient lighting conditions outside the artificial fireplace. The at least one first light source is, on the basis of the light sensor signal, configured to adjust an intensity of light that is emitted with the at least one light source. The at least one first light source may thereto be connected to the light sensor and may comprise a control unit for adjusting the intensity of the emitted light.

As a result of the adjusting of the light from the at least one first light source, the illumination of the artificial fireplace element in the interior of the housing becomes adjusted, which causes a change in visibility of the artificial fireplace element. This change may be necessary to allow the artificial fireplace element to be visible behind the semi-transparent mirror for all ambient lighting conditions, since the semi-transparent mirror may reduce the normal visibility of the artificial fireplace element.

For example during daylight conditions, reflections of the ambient light on the semi-transparent might reduce the visibility of the artificial fireplace element. The light sensor signal may be relatively high and may provide that the at least one first light source will emit light at a relatively high intensity. In the absence of daylight, on the other hand, the ambient lighting conditions may be less intense, resulting in a low light sensor signal. Accordingly, the at least one first light source will be configured to emit light at a relatively low intensity.

Furthermore, the at least one light source may be configured to also emit light when the first display device and/or the second display device are deactivated and when thus no videos are displayed. This may provide the advantage that the artificial fireplace element is also illuminated when not artificial fire is displayed. This increases the visibility of the artificial fireplace element when the artificial fireplace is not activated, despite the presence of the semi-transparent mirror in between them, in order to more accurately mimic an actual fireplace in which no actual fire is present.

In an additional or alternative embodiment, the artificial fireplace further comprises a grid, which is arranged in the interior of the housing. The grid preferably spans the entire width of the artificial fireplace and is preferably elevated above a bottom portion of the housing. At the front of the fireplace, the grid may be flush with a bottom edge of the opening in the housing, in order to prevent that users will be able to see the components of the artificial fireplace that are arranged below the grid.

The grid comprises a lattice-like structure and a plurality of through openings, through which light may pass. The first side of the grid faces at least partly in an upward direction and the artificial fireplace element is arranged on the first side of the grid. As such, the artificial fireplace element is visible along the line of sight through the opening in the housing. In an embodiment, the openings are provided as physical through holes, which extend between a first side and a second side of the grid. In an alternative embodiment, the openings are no physical openings, but the grid may then comprise a transparent glass or plastic panel, which has masked areas to from the lattice-like structure and unmasked areas to form the openings.

In a further embodiment, the artificial fireplace further comprises at least one second light source, which is arranged in the interior of the housing, and which faces an opposite second side of the grid. The at least one second light source is configured to provide the effect that the artificial fireplace element appears to glow, similar as the glowing of wooden logs in an actual fire. The at least one second light source is arranged below the artificial fireplace element so as to illuminate the artificial fireplace element from below.

In an embodiment, the artificial fireplace comprises a plurality of second light sources, which are spaced across the width of the artificial fireplace. The emitted light from the second light sources may have an orange or red colour, in order to mimic the actual effect of glowing wood. The second light sources may furthermore be configured to emit light of which the intensity varies over time. The changing intensity is intended to mimic glowing wood, since the intensity of glowing wood also fluctuates with time.

According to the present embodiment, the grid is arranged in between the second light sources and the artificial fireplace element. The emitted light from the second light sources thus first passes the openings in the grid, after which the artificial fireplace element is illuminated. The openings in the grid allow for transmission of the light, whereas the lattice-like structure blocks incident light and results in a shadow on the artificial fireplace element. The shadows of the grid create a carbonated effect on the artificial fireplace element, which makes it to resemble carbonized wooden logs.

In a further embodiment, the artificial fireplace comprises a plurality of reflective elements, which are arranged on the first side of the grid and which are configured to reflect and scatter an incident light beam. The reflective elements may for example be glass fragments, which are spread across the grid, in particular where no artificial fireplace element is arranged. The reflective elements may be illuminated as well by the light that is emitted from the second light sources, which generates an effect of glowing embers in the artificial fireplace.

In an embodiment, the artificial fireplace comprises a sound device, which is configured to emit a sound signal. The sound signal may for example be the sound of a crackling fire, which is preferably synchronized with the flames in the first video and/or second video, in order to obtain an even more realistic effect to the user. Preferably, the volume of the emitted sound signal may be adjusted and the artificial fireplace may comprise a remote control device to change the volume of the emitted sound signal.

In an embodiment, the artificial fireplace comprises a heating device, which is configured to emit heat radiation. The heating device may be an electric heater, which may have vent openings that are arranged below and/or above the opening in the housing and which face towards any users in front of the artificial fireplace. Alternatively, the heating device may be incorporated in the artificial fireplace element and/or possible glass elements on the grid, which resemble glowing embers that normally produce heat in an actual fireplace, and may be configured to emit heat radiation through a glass window that is arranged in front of the opening in the housing of the artificial fireplace. As such, the realism of the artificial fireplace is improved.

Preferably, the emitted heat radiation accurately resembles the heat that is generated by an actual fire in an actual fireplace. Preferably, the temperature and/or intensity of the emitted heat radiation may be adjusted, preferably by means of the remote control device. Alternatively, the artificial fireplace may comprise a detector, which is configured to detect the presence of users in the proximity of the fireplace and which is configured to adjust the amount of generated heat on the basis of the presence of users.

In an embodiment of the artificial fireplace, the shape of the artificial fireplace element substantially corresponds to the shape of a physical fireplace element in the actual fireplace. The housing of the artificial fireplace may comprises a first alignment device, which is fixedly arranged in the interior of the housing, and the artificial fireplace element may comprise a complementary second alignment device, which is configured to mate with the first alignment device in order to retain a relative position between the artificial fireplace element and the housing.

The artificial fireplace element may, for example, comprise a plurality of pins, which are arranged in a certain pin pattern, which may downwardly extend from element parts of the artificial fireplace element.

The artificial fireplace may comprise a corresponding amount of holes, which are arranged in the same pin pattern and which may have an inner diameter that corresponds to an outer diameter of the pins. The holes may, for example, be arranged in a grid in the housing of the artificial fireplace.

When the artificial fireplace element is arranged in the interior of the artificial fireplace, the pins are brought in the holes. The pins and holes have a complementary shape and only allow for one relative position between them. This one relative positon corresponds to the aligned position of the artificial fireplace element in the housing of the artificial fireplace. As such, the relative position between the artificial fireplace element and the displayed first and/or second video may be ensured during use of the artificial fireplace.

In an embodiment, the first display device and/or the second display device is configured to display a status signal, which is, for a user, visible along the line of sight. The status signal may comprise a certain setting of the artificial fireplace, which is to be communicated to the user by means of the status signal.

For example, the status signal comprises information about a fire setting of the artificial fireplace, which may be representative for an intensity of the displayed artificial fire pattern. Furthermore, the status signal may represent the status of a sound signal, such as the volume thereof, or the intensity of light that illuminates an artificial fireplace element within the artificial fireplace. The status signal may thereto be embodied as a number that is displayed in the first video or the second video, for example just after the corresponding setting of the artificial fireplace has been changed by the user.

The present invention further provides a method for displaying an artificial fire pattern with an artificial fireplace that comprises a housing, defining an interior and comprising at least one opening to allow a line of sight into the interior of the housing, wherein the method comprises the steps of:

displaying, with a first display device, a first video of flames towards a first side of a semi-transparent mirror, displaying, with a second display device, a second video towards an opposite second side of the semi-transparent mirror, and displaying, along a line of sight, the artificial fire pattern through the opening in the housing, wherein the semi-transparent mirror is arranged in the interior of the housing, and wherein the semi-transparent mirror at least partially reflects the first video of flames at its first side and at least partially transmits the second video at its second side, thereby recombining the first video of flames and the second video into the artificial fire pattern.

With the method according to the present invention, a more realistic artificial fire pattern is displayed, when compared to the pattern that is displayed in the prior artificial fireplace. With the present method, not only a first video of flames is displayed towards a first side of the semi-transparent mirror. Additionally, a second video is projected towards a second side of the semi-transparent mirror.

In the method according to the invention, the semi-transparent mirror combines the first video of flames and the second video, by at least partially reflecting the first video of flames at its first side and by at least partially transmitting the second video at its second side, in order to achieve an artificial fire pattern that comprises both the reflected first video of flames and the transmitted second video.

In an embodiment of the method, the second video comprises a second video of flames and/or a video of a background of a fireplace and a video of a glow effect on the background.

The second video of flames, which is displayed in the second video by the second display device, preferably differs from the first video of flames that is displayed by the first display device. For the user, the first video appears to originate from a first area that differs from the area from which the second video appears to originate. As such, a layered effect is achieved, which gives the impression of a three-dimensional effect of the flames in the artificial fireplace, and which provides for a more realistic artificial fire pattern.

The video of the glow effect resembles an enlightening effect of flames on a background of the fireplace. Along the line of sight, the glow effect appears to surround the displayed flames and will improve the realism of the artificial fire pattern.

In a further embodiment of the method, the artificial fireplace comprises am artificial fireplace element, which is arranged in the interior of the housing, and the first video has been provided by means of a method that comprises the steps of:

arranging a physical fireplace element in an actual fireplace,
creating an actual fire on the physical fireplace element,
recording a video of an actual fire pattern of the fire, and
extracting a first video from the recorded video, and
wherein the shape of the artificial fireplace element in the housing substantially corresponds to the shape of the physical fireplace element in the actual fireplace.

The first video is thus extracted from a recorded video of an actual fire. This actual fire is preferably a gas fire on a physical fireplace element, wherein the physical fireplace element may for example comprise ceramic imitations of wooden logs, which may be arranged in a stacked configuration and in which gas channels may be provided to lead flammable gas to the ends of the gas channels, where the gas is illuminated.

A video is recorded from the fire on the physical fireplace element, from which a first video may be extracted. Preferably, the extracted first video comprises an actual fire pattern of the gas fire that resembles recorded flames from a first area in the fire.

For the displaying of the artificial fire pattern in the artificial fireplace, the artificial fireplace element is arranged in the artificial fireplace such, that its shape substantially mimics the shape of the physical fireplace element in the actual fireplace. The artificial fireplace thereby accurately resembles the actual fireplace, even when no fire is present in the actual fireplace.

The extracted first video is displayed by the first display device and reflected at least partially at the first side of the semi-transparent mirror. The mirror thereby recombines the first video with an image of the artificial fireplace element. The resulting artificial fire pattern that is displayed by the artificial fireplace does thereby, seen along the line of sight, substantially correspond to the fire on the physical fireplace element in the actual fireplace.

In a further embodiment of the method, the first video comprises a glow effect, which is projected on the artificial fireplace element. According to this embodiment, the step of arranging the physical fireplace element in the actual fireplace comprises the arranging of physical fireplace element that has a black frontal surface. Such a black frontal surface reduces the visibility of the physical fireplace element in the recorded video of the actual fireplace, which is advantageous, since it is not desired to also display images of the fireplace element in the projected video. Hence, such an artificial fireplace element is already visible in the interior of the artificial fireplace and therefore not needs to be projected.

According to this embodiment, the step of extracting the first video further comprises the extracting of light that is emitted by the glowing of the physical fireplace element under the influence of the actual fire. The first videos thereby comprises flames and a glowing effect, which are to be displayed simultaneously, in order to mimic burning of the artificial fireplace element, and the glowing as a result of this artificial burning.

Alternatively, the step of extracting the first video further comprises the removing of the physical fireplace elements from the first video. Such removal may concern processing of the extracted first video, in order to remove images of the physical fireplace element therefrom. This processing may for example take place by means of digital video editing.

In an alternative or additional embodiment, the second video has been provided by means of a method that comprises the step of:

extracting a second video from the recorded video,
wherein an actual fire pattern in the second video resembles recorded flames from a second area in the fire, which is set at a distance from a first area in the fire of which the recorded flames resembles the actual fire pattern in the first video.

The second video can be provided in a similar manner as the first video and is extracted from the recorded video as well. However, the actual fire pattern in the second video resembles recorded flames from a second area in the fire. This second area is set at a distance with respect to the first area in the fire. This means that the second video represent flames that originate from a different location than the flames that are represented in the first video.

For example, the flames in the first video may represent flames that originate from a front side of the physical fireplace element in the actual fireplace, whereas the flames in the second video may represent flames that originate from a rear side of the physical fireplace element.

The first area and the second area may be defined as regions in the actual fire on the physical fireplace element. The first area is an area that is, seen along a line of sight, provided in between a first depth and a second depth into the fire. The second area may be defined accordingly between a third depth and a fourth depth, wherein the third depth and fourth depth are, along the line of sight, set further away than the first depth and the second depth. The first area in the actual fire thereby corresponds to a proximal depth region in the actual fire and the second area in the actual fire thereby corresponds to a distal depth region in the actual fire.

The extracted second video is displayed by the second display device and transmitted at least partially at the second side of the semi-transparent mirror. The displayed artificial fire pattern thereby additionally comprises the transmitted second video. As such, a layered effect is achieved in the artificial fire pattern by the first video and the second video, since both displayed videos appear to originate from a different location in the fire.

In an embodiment, the method further comprises the step of illuminating the artificial fireplace element with at least one first light source. The at least one first light source may, seen along the line sight, be arranged behind the semi-transparent mirror, such that its emitted light illuminates the artificial fireplace element without being obstructed by any element in between the at least one first light source and the artificial fireplace element. For example, the at least one first light source can be embodied as a strip of LEDs across a substantial part of the width of the interior of the artificial fireplace, e.g. the entire width thereof. The strip of LEDs may be provided against the ceiling of the housing, behind the semi-transparent mirror, As such, the artificial fireplace element is illuminated from across a substantial part of the overall width, in order to improve the realism of the illumination of the artificial fireplace element.

In a further embodiment, the illuminating of the artificial fireplace element comprises the illuminating with a flickering effect The flickering effect may for example comprise the illumination by means of emitted light that has a wavelength in the visible regime, for example having a red, orange or yellow colour for resembling the light that is emitted by actual flames in an actual fireplace. The flickering effect may alternatively or additionally comprise the varying of an intensity of the light that is emitted, in order to resemble the varying intensity of light that is emitted by actual flames in an actual fireplace.

Figure 4B:
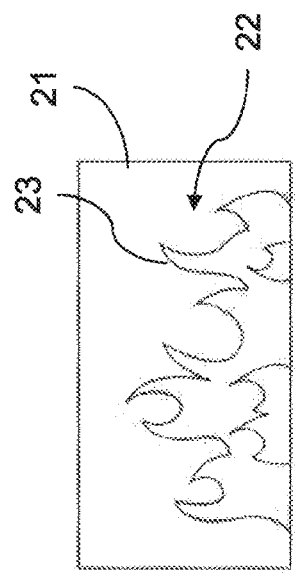
Figure 4C:
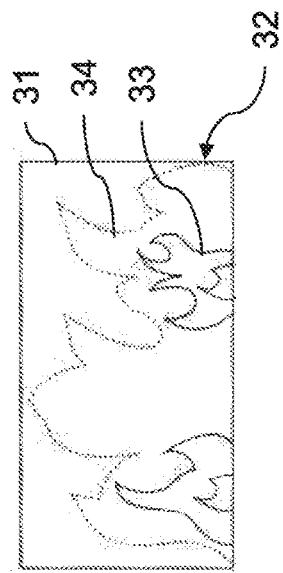

Further characteristics of the invention will be explained below, with reference to embodiments, which are displayed in the appended drawings, in which:

FIG. 1 schematically depicts an embodiment of the artificial fireplace according to the present invention, FIG. 2*a* depicts a section view on the fireplace of FIG. 1, FIG. 2*b* depicts an embodiment of a first light beam with the first video of flames and of a second light beam with the second video, FIG. 3*a* depicts a cross-sectional view on the fireplace of FIG. 1, FIG. 3*b* depicts an artificial fireplace element, FIGS. 4A-4C depict an embodiment of the recorded video, a first light beam with the first video of flames and a second light beam with the second video, and FIGS. 5A-5I depict an embodiment of a method for the displaying of an artificial fire pattern with an artificial fireplace.

Throughout the figures, the same reference numerals are used to refer to corresponding components or to components that have a corresponding function.

FIG. 1 schematically depicts an embodiment of the artificial fireplace according to the present invention, to which is referred with reference numeral 1. The artificial fireplace 1 comprises a housing 2, in which an opening 3 is provided. The housing 1 defines an interior 4 and the opening 3 is configured to provide access into the interior 4. The opening 3 is arranged at the front of the housing 2 and allows a line of sight (S) into the interior 4 of the housing 2. In the figures, the line of sight (S) is displayed be aligned in a horizontal direction, but any line along which users may look into the interior 4 of the housing 2 may be regarded as a line of sight.

In the present embodiment, the opening 3 in the housing 2 is covered with a glass pane. The glass pane is transparent for light in the visual regime, and thus allows a user to look into the interior 4 of the housing 2. Alternatively, the glass pane may also be omitted to reduce any disturbance upon looking into the interior 4 of the housing 2.

The artificial fireplace 1 further comprises a semi-transparent mirror 10, which is arranged in the interior 4 of the housing 2. The mirror 10 can also be seen in FIGS. 2 and 3. The semi-transparent mirror 10 is set at a non-right angle with respect to a horizontal direction (H) and a vertical direction (V). In the present embodiment, the angle is set at 45°. The semi-transparent mirror 10 is fixed with respect to the housing 2. At the front of the housing 2, the mirror 10 is mounted in a cross bar 11, which extends across the width of the housing 2 and in front of the opening 3 in the housing 2. The cross bar 11 is further arranged to cover a frontal edge of the mirror 10, in order to give the impression that no mirror 10 is provided at all.

The semi-transparent mirror 10 comprises a first side 12, which faces the opening 3 in the housing 2 and which is partly aligned in an upward vertical direction as well. The first side 12 of the mirror 10 is configured to at least partially reflect a video that is displayed towards it.

The semi-transparent mirror 10 comprises a second side 13, which is arranged opposite to the first side 12, and which faces the away from the opening 3. The second side 13 is partly aligned in a downwards vertical direction as well. The second side 13 of the mirror 10 is configured to at least partially transmit a video that is displayed towards it.

The mirror 10 is configured to transmit the beam from its second side 13 towards the first side 12. At the first side 12, the transmitted beam from the second side 13 and the reflected beam from the first side 12 are recombined and a combined beam is emitted from the first side 12. Due to the orientation of the mirror 10 at 45° with respect to the vertical direction (V) and the horizontal direction (H), the first display device 20 may be arranged substantially horizontally, configured to display the first video of flames in the downward vertical direction (V) and the second display device 30 may be arranged substantially vertically, configured to display the second video in the horizontal direction (H).

The artificial fireplace 1 comprises a first display device 20, which is arranged in the interior 4 of the housing 2 at a top portion of the housing 2. In the present embodiment, the first display device 20 is provided as a flat-screen monitor 20, which is configured to emit a first light beam 21 in the downward vertical direction (V). The first light beam 21 is thereby projected onto the first side 12 of the semi-transparent mirror 10, where it is at least partially reflected thought the opening 3 in the housing 2. The first video of flames 22 may be comprised in the emitted first light beam 21, such that the emitting of the first light beam 21 by the first display device 20 corresponds to the displaying of the first video of flames 22.

The artificial fireplace 1 further comprises a second display device 30, which is arranged in the interior 4 of the housing 2, at a rear portion thereof. The second display device 30 is, in the present embodiment, a flat-screen monitor 30 as well, which extends in the vertical direction (V). The second display device 30 is configured to emit a second light beam 31 in the horizontal direction (H), onto the second side 13 of the semi-transparent mirror 10, where the second light beam 31 is at least partially transmitted towards the first side 12 of the mirror 10. The second video 32 may be comprised in the emitted second light beam 31, such that the emitting of the second light beam 31 by the second display device 30 corresponds to the displaying of the second video 32.

The minor 10 is configured to recombine the first light beam 21 and the second light beam 31, and to transmit this combined beam through the opening 3, along the line of sight (S). Since the first light beam 21 is reflected on the first side 12 of the mirror 10, it appears, when seen along the line of sight (S), that the first light beam 21 originates from a virtual vertical plane 21' that intersects the minor 10. In FIG. 3*a*, this virtual vertical plane 21' is indicated by the dashed line.

The second light beam 31 originates from the second display device 30 and is emitted in the horizontal direction (H), which is substantially parallel to the line of sight (S). Also for users, which look into the housing 2 though the opening 3 and along the line of sight (S), the second light beam 31 appears to originate from the rear portion of the housing 2, whereas the first light beam 21 appears to originate from the virtual vertical plane 21'. For the user, it thus appears that there is a spacing A in between the projections of the first light beam 21 and the second light beam 31. In FIG. 2b, this spacing A between the light beams 21, 31 is shown schematically.

In this embodiment of the artificial fireplace 1, the first light beam 21 comprises the first video of flames 22 and the second light beam 31 comprises the second video of flames 32. Both videos have been extracted from a recorded video of an actual fire and thus form an accurate display of flames. Alternatively, the first video and second video may also be rendered videos of a virtual fire, which can, for example, be rendered real-time by a controller of the artificial fireplace.

The artificial fireplace 1 further comprises a grid 40, which is arranged in the interior 4 of the housing 2. The grid 40 extends at least partially in the horizontal direction (H) and has a lattice-like structure, defining through openings. The grid 40 has a first side 41, which faces at least partially in the upwards vertical direction. A front portion of the grid 40 is slightly bent in a downwards direction and extends towards a bottom edge of the housing 2, adjacent the opening 3.

The artificial fireplace 1 comprises an artificial fireplace element 50, which comprises a plurality of element parts, which are arranged in a stacked configuration and which are arranged in the interior 4 of the housing 2 as well. The artificial fireplace element 50 resembles a physical fireplace element in an actual fireplace and resembles, in the present embodiment of the artificial fireplace 1, stacked wooden logs in a wood fire.

The artificial fireplace element 50 is arranged on the grid 40 and the element parts are stacked, in order to resemble actual wooden logs. The artificial fireplace element 50 is arranged in between the semi-transparent mirror 10 and the second display device 30 and the second side 13 of the mirror 10 faces the artificial fireplace element 50.

It is displayed in FIG. 3b that a frontal surface 51 of at least one of the element parts of the artificial fireplace element 50 is aligned parallel to the virtual vertical plane 21' of the first light beam 21. This at least one element part does therefore not intersect with the virtual vertical plane 21', and the vertical frontal surface 51 allows for accurate focussing of the first light beam 21 and allow a user to experience the flames in the first video 22 to appear to originate from the virtual vertical plane 21'.

The artificial fireplace element 50 is arranged in between the virtual vertical plane 21', from which the first light beam 21 appears to originate, and the second display device 30, from which the second light beam 31 originates. Both light beams 21, 31 comprise videos of flames 22, 32, such that a three-dimensional flame effect is achieved. Hence, it appears that there are flames both in front of or on the artificial fireplace element 50 and behind the artificial fireplace element 50.

The artificial fireplace 1 further comprises a light source, which is in the present embodiment embodied as a strip of LEDs 52 that is arranged in the interior 4 of the housing 2, at the top portion thereof. The strip of LEDs 52 extends over substantially the entire width of the housing 2 and is configured to illuminate the artificial fireplace element 50 that is arranged below. As such, the illuminated artificial fireplace element 50 has, for the users, an improved visibility within the interior 4 of the housing 2. The fireplace 1 further comprises a shielding 53, which is arranged in front of the strip of LEDs 52 and which is configured to prevent the emitted light from the strip of LEDs 52 from directly reaching the opening 3 in the housing 2.

The artificial fireplace 1 further comprises a plurality of second light sources 54, which are arranged in the interior 4 as well. The second light sources comprise a plurality of lamps 54, which extend over the width of the housing 2 and which are spaced with respect to each other. The lamps 54 are arranged below the grid 40 and face toward a second side 42 of the grid 40, which is arranged opposite to the first side 41 and which faces at least partially in a downwards direction.

The lamps 54 are configured to illuminate the artificial fireplace element 50 as well. The light from the lamps 54 passes through the openings in the grid 40 and shines on the artificial fireplace element 50. The lattice of the grid 40 causes a grid-like shadow on the artificial fireplace element 50, since only the light that passes through the openings in the grid 40 reaches the artificial fireplace element 50. This grid-like shadow creates a carbonated effect on the artificial fireplace element 50, which makes element parts to resemble carbonized wooden logs.

Preferably, the lamps 54 emit light in the visible regime, having a wavelength that corresponds to a light colour in the spectrum between red and yellow, to resemble a glowing effect of the artificial fireplace element 50. The lamps 54 are controlled by a controller 62 to emit light with an intensity that varies over time, in order to achieve an even more realistic glowing effect of the artificial fireplace element 50. The controller 62 is configured to synchronize the changes in intensity with the pattern of flames that is displayed in the first and second videos 22, 32 in the first and second light beams 21, 31.

In between the bottom edge of the opening 3 in the housing 2 and the cross bar 11, a lower portion 3' of the opening 3 allows a user to look at a portion of the grid 40. Here, the light from the lamps 54 is visible as well. Preferably, but not displayed in the figures, comprises the artificial fireplace 1 a large amount of reflective scattering elements, which are arranged on the first side 41 of the grid 40. The reflective elements may for example be glass fragments, which are configured to reflect and scatter incident light beams. The glass elements are configured to reflect and scatter the light that is emitted by the lamps 54, coming from below through the openings in the grid 40, in order to resemble glowing embers on the grid 40. These glass elements are visible through the lower portion 3' and provide that the artificial fireplace 1 resembles an actual fireplace even more realistically.

The artificial fireplace further comprises a sound device 60 and a heating device 61. The sound device 60 is arranged on top of the housing 2 and is configured to emit a sound signal that resembles the sound of an actual wood fire in an actual fireplace. The heating device 61 is arranged in the interior 4 of the housing 2, below the opening 3, and is configured to emit heat radiation. The emitted heat radiation mimics the heat that is generated by an actual fire in an actual fireplace and may serve the purpose of creating a more realistic artificial fireplace 1, but may even contribute in heating a room in which the artificial fireplace 1 were to be installed. Preferably, the housing 2 comprises vent holes at its front, below the opening 3, in order to allow the escape of the heat radiation from the heating device 61.

The artificial fireplace 1 further comprises a controller 62 and a digital storage device 63. The controller 62 is electrically connected to the first display device 20 and to the second display device 30 and is configured to control the display devices 20, 30. The controller 62 is furthermore connected to the storage device 63. The storage device 63 comprises at least the first video 22 and the second video 32, which are stored on the storage device 63. The storage device 63 is, in the present embodiment, provided as a media player, which is connected to the display devices 20, 30 in order to emit the light beams 21, 31 with the videos 22, 32.

The storage device 63, with the first video 22 and the second video 32 stored thereon, and the artificial fireplace element 50 together form a fireplace element assembly. In case the user is interested in a different artificial fire pattern of the artificial fireplace 1, he or she may provide a different fireplace element assembly and may replace the artificial fireplace element 50 of the present assembly with the artificial fireplace element of the replacement assembly, which may have element parts that are stacked in a different configuration. The storage device of the replacement assembly comprises different first and second videos, which correspond to the artificial fireplace element of the replacement assembly. Preferably, the videos on the storage device of the replacement assembly have been extracted from a recorded video of an actual fire in which that physical fireplace element was arranged similarly as the artificial fireplace element of the replacement assembly. When these different videos are projected in the first and second light beams, the artificial fire pattern that is generated by the artificial fireplace changes and the user can have a different fireplace impression, without having to replace the entire artificial fireplace 1.

FIG. 4a depicts an example of a recorded video of an actual fire in an actual fireplace. The actual fire can be a wood fire, but is preferably a gas fire. In the present embodiment, the recorded video is recorded from an actual gas fire on a physical fire element that represents wooden logs, as if the actual gas fire actually were a wood fire.

After the video has been recorded, a first video 22 and a second video 32 are extracted therefrom. This extraction is, at least in the present embodiment, carried by means of appropriate software that allows a user to spread the contents of a single video over multiple videos.

The single recorded video comprises all flames that are present in the actual fireplace. By means of the extraction, flames from different areas in the actual fire may be isolated in order to form multiple videos, which each comprise an image of the flames at a different area in the actual fireplace.

In FIG. 4b, the emitted first light beam 21 is displayed, which comprises the first video 22. The first video 22 is extracted from the recorded video and comprises recorded flames 23 that originate from a first area in the actual fire. This first area is generally chosen to be an area that is, when seen along a line of sight, located at a front part of the actual fire and of the physical fireplace element and which is, in the present embodiment, aligned perpendicular to the line of sight. Hence, when the first video 22 is displayed in the artificial fireplace 1, it appears that the flames 23 therein originate from the virtual vertical plane 21', which is arranged at a front part artificial fireplace element 50.

In FIG. 4c, the emitted second light beam 31 is displayed, which comprises the second video 32. The second video 32 is extracted from the recorded video as well and comprises recorded flames 33 that originate from a second area in the actual fire. The second area in the actual fire is spaced from the first area and is, when seen along the line of sight, arranged at a rear part of the actual fire and of the physical fireplace element. The second plane is, in the present embodiment, aligned perpendicular to the line of sight as well.

During use of the artificial fireplace 1, the second video 32 is projected from the second display device 30, which is arranged behind the artificial fireplace element 50. It thereby also appears that the flames 33 in the second video 32 also originate from behind the artificial fireplace element 50.

The second video 32 not only comprises the recorded flames 33, but also comprises a video 34 of a glow effect on a background of the physical fireplace, which is extracted from the recorded video as well. This video of the glow effect 34 comprises the glow effect of the background of the actual fireplace, being illuminated by the flames of the actual fire. In FIG. 4c, the glow effect is indicated by the dashed line.

The first video 22 and the second video 32 are stored on the storage device 63 of the artificial fireplace 1 and the controller 62 is configured to control the first display device 20 to emit the first light beam 21 with the first video 22 and to control the second display device 30 to emit the second light beam 31 with the first video 32.

The storage device 63 furthermore comprises a plurality of further first videos and further second videos. The further first videos and second have been extracted from a recorded similarly as the first video 22 and the second video 32, but the respective recorded videos have been recorded of the actual gas fire having a different gas fire setting. In the present embodiment, the gas fire setting is a setting for the amount of gas supply towards the actual gas fire. A high gas fire setting corresponds to a large gas supply and a high intensity of the actual gas fire, whereas a low gas fire setting corresponds to a small gas supply and a low intensity of the actual gas fire.

For obtaining of the further first second videos, first, a gas fire setting is stored. Then, a respective video is recorded, which is extracted in a respective first video and second video, which are stored and are linked to the respective gas fire setting.

The artificial fireplace 1 comprises an input device. In the present embodiment, the input device may be a rotatable knob 64, which is connected to the controller 62. The knob 64 allows a user of the artificial fireplace 1 to set a parameter for the artificial fire pattern that is to be displayed with the artificial fireplace 1. In an alternative embodiment, the input device may be a remote control device or may be a mobile communication device, such as a smartphone, on which an application is installed to control the artificial fireplace. The input device may for example be formed by one or more buttons on the remote control device or may be formed by a virtual slider in the application on the mobile communication device.

The parameter may for example represent an intensity of the displayed artificial fire pattern. The controller 62 is configured to select the one of the gas fire settings for the actual gas fire that are associated with the set parameter. Subsequently, the controller 62 is configured to select the respective first video 22 and second video 32 that corresponds to the selected gas fire setting and is configured to control the first display device 20 to emit a first light beam 21 that comprises that respective first video 22 and to control the second display device 30 to emit a second light beam 31 that comprises that respective second video 32.

It may, however, as well occur that the set parameter does not correspond to a certain gas fire setting of the actual gas fire, but that it corresponds to a setting in between two consecutive gas fire settings. In this situation, the controller 62 may further be configured to control the first display device 20 to emit a first light beam 21 with a combination of first videos 22 and to control the second display device 30 to emit a second light beam 31 with a combination of second videos 32. The combination of first videos 22 may thereby be formed by a weighted average of the first videos 22 that corresponds to the consecutive gas fire settings and the combination of second videos 32 may be formed accordingly by a weighted average of the second videos 32 that corresponds to the consecutive gas fire settings as well.

The storage device 63 further comprises, for each of the gas fire settings, a setting value for the heating device 61. The heating output of the heating device 61, at a certain heating setting, preferably corresponds to the amount of heat that is generated by the actual gas fire at the corresponding gas fire setting. As such, the heating device 61 is configured to generate a realistic amount of heat that corresponds to the artificial fire pattern that is displayed by the actual fireplace 1.

The artificial fireplace 1 is configured to display an artificial fire pattern 70. A schematic representation of the artificial fire pattern 70 is visible in the artificial fireplace 1 in FIG. 2a. The artificial fire pattern 70 is, at least in the present embodiment, provided by the first light beam 21 and the second light beam 31. The first light beam 21 thereby comprises a first video 22, comprising recorded flames 23, and the second light beam 31 comprises a second video 32, comprising recorded flames 33.

For providing the first video 22 and the second video 32, a video is recorded of an actual fire pattern of an actual fire. In FIG. 5, the process of the providing of the videos 22, 32 and the displaying of the artificial fire pattern 70 is schematically displayed.

First, a physical fireplace element 101, comprising a plurality of stacked physical element parts, is arranged in an actual fireplace 100, or an actual fireplace is provided in which the physical fireplace element is already arranged. Preferably, the element parts of the physical fireplace element 101 are interconnected in order to assure their relative positions and to assure the position of the physical fireplace element 101 within the actual fireplace 100. The physical fireplace element may, in an embodiment, comprise wooden logs. In the present embodiment, the physical fireplace element 101 are provided as flame-resistant imitation logs 101, which resemble actual wooden logs, but which are able to resist heat.

The element parts of the physical fireplace element 101 are provided with gas channels, through which a flammable gas is guided. At the ends of these channels, the gas may escape into the actual fireplace 100 and is ignited in order to create an actual gas fire 102 on the physical fireplace element 101. The flames of the actual gas fire 102 form an actual fire pattern 103 on the physical fireplace element 101. The actual gas fire 102 and corresponding actual fire pattern 103 are displayed in FIG. 5b.

The actual fire pattern 103 varies with respect to the depth in the actual fireplace 100, parallel to a line of sight and perpendicular to the plane of FIG. 5. At the front of the actual fireplace 100, a first area 100' is located. Towards the rear of the actual fireplace 100, a second area 100" is located. The second area 100" is, when seen perpendicular to the plane of FIG. 5, set a distance from the first area 100', e.g. towards the back of the actual fireplace 100.

The first area 100' and second area 100" may be defined as regions in the actual fire 102, which span along a distance into the physical fireplace 100, seen along the line of sight. The first are 100' is thereby provided in a proximal depth region in the actual fire 102 and the second area 100" in the actual fire 102 corresponds to a distal depth region in the actual fire 102.

For the providing of the first video 22 and the second video 32, first, a video is recorded from the actual fire pattern 103 in the actual fireplace 101. In FIG. 5b, an image is displayed which represents the recorded video.

The recorded video is extracted into a first video 22, which comprises flames that originate from the first area 100' and which form a respective actual fire pattern 103'. In FIG. 5c, an image is displayed which represents the extracted first video 22. The recorded video is further extracted into a second video 32, which comprises flames that originate from the second area 100" and which form a respective actual fire pattern 103". In FIG. 5d, an image is displayed which represents the extracted second video 32.

The recorded first video 22 and second video 32 are stored on the storage device 61 of the artificial fireplace 1.

In the actual fireplace 100, the gas fire setting may be changed in order to change the gas supply and to increase or decrease the intensity of the actual gas fire 102. For each of the gas fire settings, a video may be recorded of the actual fire pattern at both the first area 100' and the second area 100". The corresponding extracted first videos 22 and second videos 32 are stored together with their respective gas fire settings on the storage device 63 of the artificial fireplace 1.

In FIG. 5e, element parts of the artificial fireplace element 50 are shown, which are arranged in an interior 4 of an artificial fireplace 1. For the displaying of the artificial fire pattern 70, first, the artificial fireplace element 50 is positioned in the interior 4, such that its position corresponds to the position of the physical fireplace element 101 in the actual fireplace 100. This adapting may comprise the arranging of the individual element parts of the artificial fireplace element 50 with respect to each other, but may also comprise moving of the artificial fireplace element 50 itself, e.g. in the entire stacked configuration. The double-sided arrow in between the drawings in FIG. 5e indicates the comparison between the position of the physical fireplace element 101 in the physical fireplace 100 and the position of the artificial fireplace element 50 in the interior 4 of the artificial fireplace 1.

Preferably, the element parts of the artificial fireplace element 50 are connected to each other in a stacked configuration that corresponds to the stacked configuration of the element parts of the physical fireplace element 101 in the actual fireplace 100. More preferable, the artificial fireplace element 50 comprises an alignment device, which is configured to mate with an alignment device in the artificial fireplace 1 in order to ensure correct positioning of the artificial fireplace element 50 in the artificial fireplace 1.

Then, the first light beam 21 may be tuned in the artificial fireplace 1, in order to shift a position of the first video 22 with the first light beam 21. The first light beam 21 is adjusted such that, when seen along the line of sight (S) into the artificial fireplace 1, the first video 22 is aligned with the artificial fireplace element 50 in the interior 4 of the artificial fireplace 1. This step of tuning of the first light beam 21 is schematically displayed in FIG. 5f.

Upon tuning, the flames in the first video 22 become aligned with the artificial fireplace element 50, as if they actually originated from the artificial fireplace element 50 in the artificial fireplace 1, instead of originating from the physical fireplace element 101 in the actual fireplace 100.

In the present embodiment, the same may be done for the second light beam 31, which comprises the second video 32.

The second light beam 31 is tuned as well, in order to align the flames in the second video 32 with the artificial fireplace element 50, so that it appears that the flames in the second video 32 actually originate from the artificial fireplace element 50 in the artificial fireplace 1, instead of originating from the physical fireplace element 101 in the actual fireplace 100. This step of tuning of the second light beam 31 is schematically displayed in FIG. 5g.

The tuning of the first light beam 21 and of the second light beam 31 may be done by tuning of the first display device 20 and the second display device 30, so as shift the position from the which the first light beam 21 and the second light beam 31 are emitted. Preferably, this shifting of the emitting position on the first display device 20 and the second display device 30 is controlled by means of the controller 62 of the artificial fireplace 1. Alternatively or additionally, the first display device 20 and the second display device 30 may be shifted in their entirety with respect to the artificial fireplace element 50 in order to shift the first light beam 21 and the second light beam 31.

By tuning of the first light beam 21 and the second light beam 31 in the artificial fireplace 1, the displayed first video 22 and second video 32 are aligned with the artificial fireplace element 50, so that the first video 22, second video 32 and the artificial fireplace element 50 along the line of sight (S) together form an artificial fire pattern 70 that resembles the actual fire pattern 103 in the actual fireplace 100, as is displayed in FIG. 5h.

In an additional embodiment of the method, the second video 32' further comprises a glow effect 104 on the background in the actual fireplace 100. This is schematically displayed in FIG. 5i, in which it is shown that the second video represents an actual fire pattern 103" on the second area 100" in the actual fireplace 100 and a glow effect 104 on a background of the actual fireplace 100.

The tuning of the second light beam 21 with the second video 32' now also comprises the adjusting of the position of the glow effect 34 with respect to the artificial fireplace element 50 in the artificial fireplace 1, as is schematically displayed in FIG. 5j. Hence, the glow effect 34 forms part of the second video 32', so when the second light beam 31 is tuned to adjust a position of the flames 33 in the second video 32', the position of the glow effect 34 is automatically adjusted accordingly. In FIG. 5k, the glow effect 34 is shown to be aligned in the artificial fireplace 1 as well, forming part of the artificial fire pattern 70'.

In a further additional embodiment, as displayed in FIG. 5l, the first video 22' further comprises an additional animation 35. The additional animation 35 is, in the present embodiment, a cartoon figure. However, the additional animation may as well comprise advertising content or the like, or may comprise additional images or videos to, for example, adapt the displayed artificial fire pattern to the surroundings of the artificial fireplace 1. The additional image or video may thereto, for example, comprise a colouring that corresponds to a colour pattern outside the artificial fireplace 1.

The invention claimed is:

1. Artificial fireplace for displaying an artificial fire pattern, comprising:
    a housing, defining an interior and comprising at least one opening to allow a line of sight into the interior of the housing,
    a semi-transparent mirror, which is arranged in the interior of the housing and which comprises:
        a first side, facing the opening, and
        an opposite second side, facing away from the opening,
    a first display device, which is arranged in the housing and which is configured to display a first video of flames, wherein the artificial fireplace further comprises:
    a second display device, which is arranged in the housing and which is configured to display a second video,
    wherein the semi-transparent mirror is arranged to at least partially reflect the first video of flames at its first side and to at least partially transmit the second video at its second side, to recombine the first video and the second video into the artificial fire pattern, such that the artificial fire pattern is visible along the line of sight.

2. Artificial fireplace according to claim 1, wherein the second video comprises a second video of flames.

3. Artificial fireplace according to claim 1, wherein the second video comprises a video of a background of a fireplace and further comprises a video of a glow effect on the background.

4. Artificial fireplace according to claim 3, wherein the video of the glow effect on the background is substantially synchronized with the first video of flames and/or with the second video of flames.

5. Artificial fireplace according to claim 1, wherein the semi-transparent minor is, in an installed configuration of the artificial fireplace, set at a non-right angle with a vertical direction.

6. Artificial fireplace according to claim 5, wherein the first side of the semi-transparent minor at least partially faces in an upright direction, wherein the first display device is arranged at least partially above the semi-transparent minor, and wherein the first video of flames is displayed in a downward direction.

7. Artificial fireplace according to claim 5, wherein the non-right angle between the semi-transparent minor and the vertical direction is between 25° and 65°.

8. Artificial fireplace according to claim 1, further comprising an artificial fireplace element, which is arranged in the interior of the housing, in between the second display device and the semi-transparent mirror.

9. Artificial fireplace according to claim 8, further comprising at least one first light source, which is arranged adjacent the artificial fireplace element and which is configured to illuminate the artificial fireplace element.

10. Artificial fireplace according to claim 8, further comprising a grid, which is arranged in the interior of the housing, wherein the artificial fireplace element is arranged on a first side of the grid.

11. Artificial fireplace according to claim 10, further comprising at least one second light source, which is arranged in the interior of the housing, and which faces an opposite second side of the grid.

12. Artificial fireplace according to claim 1, further comprising a sound device, which is configured to emit a sound signal.

13. Artificial fireplace according to claim 1, further comprising a heating device, which is configured to emit heat radiation.

14. Method for displaying an artificial fire pattern with an artificial fireplace that comprises a housing, defining an interior and comprising at least one opening to allow a line of sight into the interior of the housing, wherein the method comprises the steps of:
    displaying, with a first display device, a first video of flames towards a first side of a semi-transparent mirror,
    displaying, with a second display device, a second video towards an opposite second side of the semi-transparent mirror, and displaying, along a line of sight, the artificial fire pattern through the opening in the housing, wherein the semi-transparent mirror is arranged in the interior of the housing, and wherein the semi-transparent mirror at least partially reflects the first video of flames at its first side and at least partially transmits the second video at its second side, thereby recombining the first video of flames and the second video into the artificial fire pattern.

15. Method according to claim 14, wherein the second video comprises one or more of:

a second video of flames, and a video of a background of a fireplace and/or a video of a glow effect on the background.

16. Method according to claim 15, wherein the second video has been provided by a method that comprises the step of:

extracting a second video from the recorded video, wherein an actual fire pattern in the second video resembles recorded flames from a second area in the fire, which is set at a distance from a first area in the fire of which the recorded flames resemble the actual fire pattern in the first video.

17. Method according to claim 14, wherein the artificial fireplace comprises an artificial fireplace element, which is arranged in the interior of the housing, and wherein the first video has been provided by a method that comprises the steps of:

arranging a physical fireplace element in an actual fireplace, creating an actual fire on the physical fireplace element, and recording a video of an actual fire pattern of the fire, and extracting a first video from the recorded video, and wherein the shape of the artificial fireplace element in the housing substantially corresponds to the shape and position of the physical fireplace element in the actual fireplace.

18. Method according to claim 17, wherein the first video comprises a glow effect, which is projected on the artificial fireplace element, wherein the step of arranging the physical fireplace element in the actual fireplace comprises the arranging of physical fireplace element that has a black frontal surface, and wherein the step of extracting the first video further comprises the extracting of light that is emitted by the glowing of the physical fireplace element under the influence of the actual fire or wherein the step of extracting the first video further comprises the removing of the physical fireplace elements from the first video.

* * * * *